United States Patent [19]

Lawson-Tancred

[11] 4,274,010
[45] Jun. 16, 1981

[54] ELECTRIC POWER GENERATION

[75] Inventor: Henry Lawson-Tancred, Boroughbridge, England

[73] Assignee: Sir Henry Lawson-Tancred, Sons & Co., Ltd., Yorkshire, England

[21] Appl. No.: 855,688

[22] Filed: Nov. 29, 1977

[30] Foreign Application Priority Data

Mar. 10, 1977 [GB] United Kingdom ............... 10085/77
Apr. 26, 1977 [GB] United Kingdom ............... 17272/77

[51] Int. Cl.³ .............................................. F03D 9/02
[52] U.S. Cl. ........................................ 290/55; 60/398; 60/413; 60/418; 417/250; 417/331; 290/44
[58] Field of Search ................ 60/398, 413, 418, 371; 322/35; 290/44, 55; 417/250

[56] References Cited

U.S. PATENT DOCUMENTS

| 1,366,844 | 1/1921 | Snee, Jr. ............................ 290/44 |
| 2,292,927 | 8/1942 | Bunker ............................. 290/4 R |
| 2,330,739 | 9/1943 | Piron ............................... 60/418 |
| 2,539,862 | 1/1951 | Rushing ............................ 290/44 |
| 3,269,121 | 8/1966 | Bening . | |
| 3,515,889 | 6/1970 | Kammerer . | |
| 3,974,395 | 8/1976 | Bright ............................. 290/44 |
| 4,031,702 | 6/1977 | Burnett et al. .................... 60/398 |
| 4,149,092 | 4/1979 | Cros .............................. 290/54 |

FOREIGN PATENT DOCUMENTS

| 725038 | 10/1931 | France . |
| 1036689 | 2/1951 | France . |
| 2276652 | 4/1974 | France . |
| 2292879 | 11/1974 | France . |
| 2303178 | 3/1975 | France . |

Primary Examiner—B. Dobeck
Assistant Examiner—John W. Redman
Attorney, Agent, or Firm—Oblon, Fisher, Spivak, McClelland & Maier

[57] ABSTRACT

Electric power is generated from a non-uniformly operating energy source such as wind or water waves by driving hydraulic pump means by a wind wheel or a bobbing float. The pump feeds hydraulic medium into a cylinder to raise a piston loaded by a weight. When the weight rises above a predetermined level, the medium is fed under its constant pressure to drive an hydraulic motor connected to an induction generator. Because the generator is driven at constant power (though intermittently) it can be connected to the public mains supply, eliminating the need to store power, without sophisticated interface arrangements. A second generator connected to a resistive space or water heating load can be cut in at higher energy levels. The hydraulic pump can be arranged to extract power from the source in the most efficient way.

11 Claims, 3 Drawing Figures

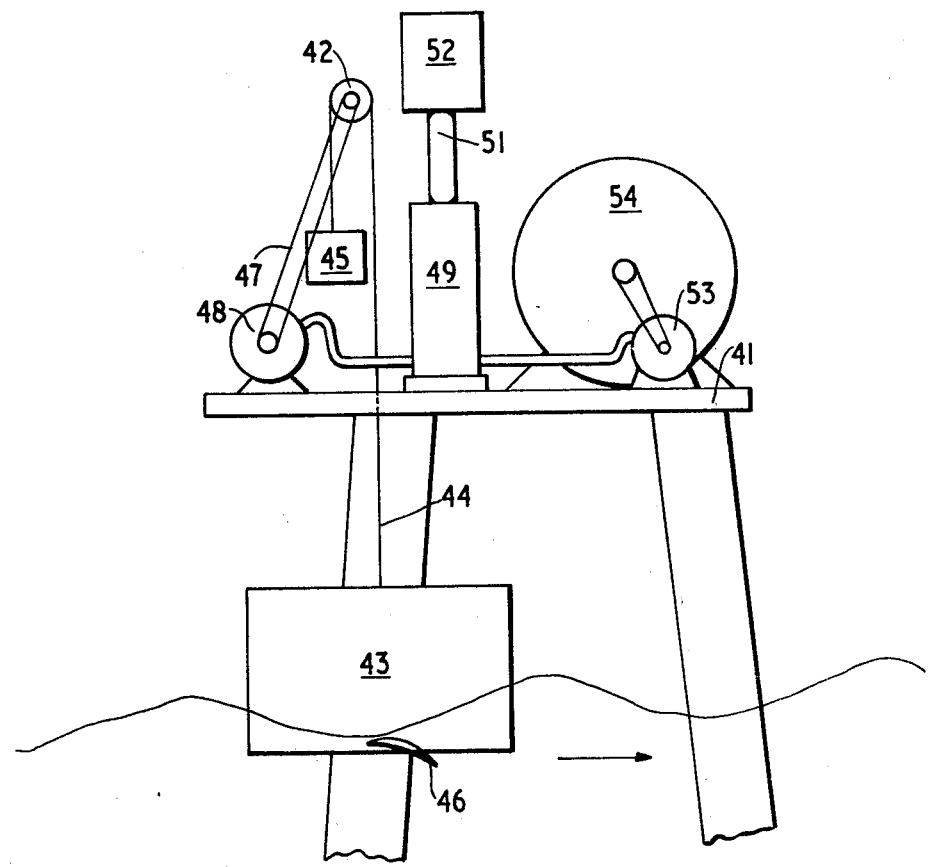
-FIG.2.-

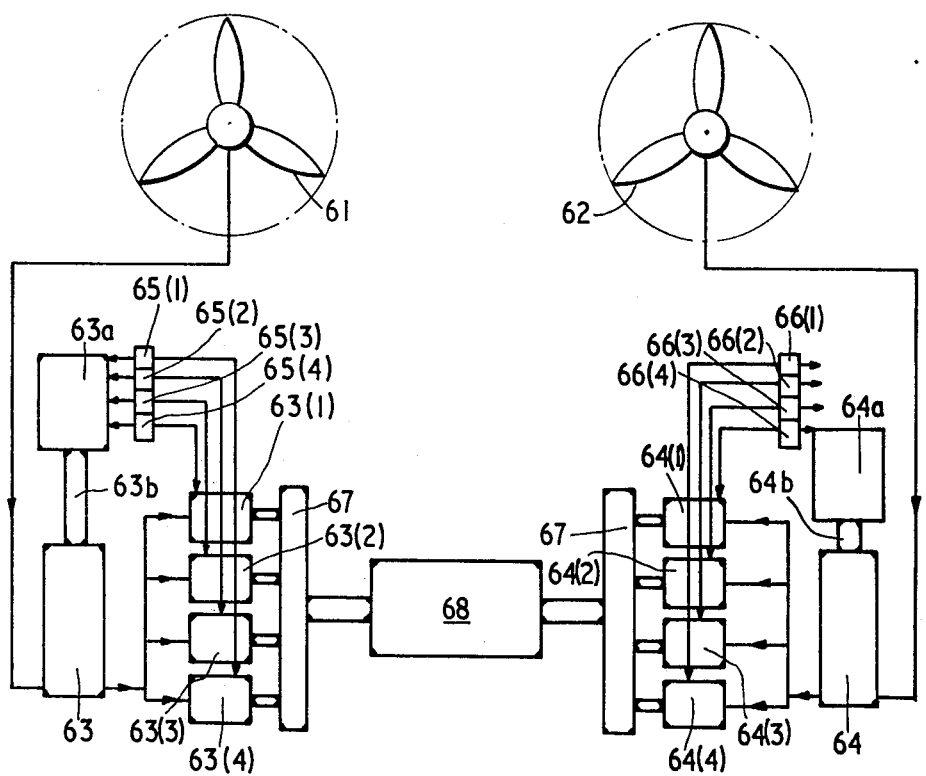
-FIG.3.-

ELECTRIC POWER GENERATION

This invention relates to the generation of electric power from non-uniformly operating energy sources such as wind, or water waves.

BACKGROUND TO THE INVENTION

There is a multiplicity of problems connected with the use of such energy for power generation. The variable nature of wind speed and wave height, and the relatively infrequency of adequately strong winds or waves in preferred areas of habitation mean that without storing the power generated at irregular and mostly relatively low levels, a wind or water wave generator of economic size is scarcely ever able to meet the maximum demand on it. And of course storage of electrical energy is in itself problematical and expensive. On the other hand, since strong winds and high waves do happen, however infrequently, special measures are required to protect the installation, largely because the electric generator, if it is designed for average wind conditions or for normal waves, cannot absorb the very much higher power levels in high winds or waves. The power output of a wind wheel, for example, can be proportional to the cube of the wind speed. Largely on account of this fact, windmills have been designed which accommodate higher-than-average wind speeds by a loss of efficiency—the so-called Cretan windmill, with fabric sails that flap and lose lift at higher wind speeds is an example in which the speed limitation is inherent in the design. Other types of wind wheel have mechanisms, which can be automatic, for adjusting the angle of attack of the blades, and, of course, the friction brake is often resorted to. Using a generator sufficiently large to absorb high wind power such as is only infrequently encountered would involve high capital costs, and incur heavy losses due to the inefficiency of the generator at the lower, average speeds. Similar considerations clearly apply to wave power generators.

Wind generators, for example for domestic purposes, have a further disadvantage in that they must be kept quite separate from the mains supply, so that mains power cannot be used to supplement the wind generator power during high local demand periods or periods of low wind, nor, without expensive phase and voltage matching equipment, can they be used to feed back into the mains ("selling" electricity back to the power station, running the meter backwards) when local demand does not absorb the entire wind generated supply.

The present invention provides a method and apparatus for wind power generation in which this last mentioned disadvantage can be eliminated, and in which many other disadvantages are avoided or substantially reduced.

SUMMARY OF THE INVENTION

The invention comprises a method for generating electricity in which a non-uniformly operating energy source such as wind or water waves drives a rotary electric generator, characterised in that energy from the source is accumulated in intermediate form and converted into kinetic energy driving the generator at constant power when the amount of accumulated energy exceeds a predetermined value.

The energy source may drive a pump which elevates a loaded, for example, gravity loaded, piston hydraulically and the generator is then driven by the hydraulic pressure when the piston is elevated above a given height. If the rate at which the pump supplies fluid to the cylinder falls short of the rate at which the fluid is fed to drive the generator, the piston will fall. When the piston has fallen to a lowermost level, the supply to drive the generator is stopped and the piston begins to rise again. The fluid is fed to the generator—which is driven by a hydraulic motor—at constant pressure, namely the pressure determined by the loading on the piston. If the rotational speed of the generator is controlled, it will therefore operate at constant power and at optimum efficiency. The operation will, of course, be intermittent. In these circumstances, however, the generator can be an induction machine or a synchronous machine connected to an alternating mains supply and a local load so as to feed energy into the mains supply when its constant power output exceeds local demand, but to allow local demand to be supplied from the mains supply when the generator is not driven from the accumulated energy or when local demand exceeds the said constant power output.

So long as the generator output is small compared to the prime feeder for the mains network, the induction machine will lock on to the mains frequency, avoiding the need for complicated frequency and phase matching equipment.

Although at low source energy supply rate, the generator operation is intermittent, the periods in which it is operating increase with increasing wind speed or wave height until it is operating continuously. If the source energy supply rate increases still further, more energy will be accumulated than will be consumed by the generator. If a second generator is provided this excess energy can be used to drive it exactly as with the first mentioned generator. As the rate of power supply increases above that necessary to keep the first generator operating continuously, the second will operate at first for short periods, then for increasingly long periods until it too is operating continuously. When the supply of energy exceeds the generating capacity, excess energy can be dumped. This, of course, introduces a measure of inefficiency for which prior art arrangements are criticised above. However, in this regard there is an important distinction from the prior art methods in that prior art generators had to be specified for average conditions, whereas with the invention the generator can be specified to work efficiently at much higher wind speeds or wave heights, so that it becomes necessary to envisage energy dumping only on rare occasions.

Whereas the first mentioned generator may be synchronised with the mains supply so as to provide lighting and power for clocks, radios and other electronic equipment, motor-driven appliances and the like, as well as to reverse-run the meter in times of excess of supply over local demand, the second generator may be connected to a purely resistive load for heating purposes, either for water heating or for space or storage heating. The first mentioned generator does not need to be very large, for domestic purposes—a 5 KW machine would be a convenient size—whereas the second generator can be substantially larger, for example a 25 KW machine. The generators will clearly require to be matched to the wind wheel or other energy source. Such a combination of a 5 KW and a 25 KW generator is very suitable for a 60 foot (18 meter) diameter windwheel. A local mains network, especially in country districts, where it is expected windwheel of such size could best be accommodated, might not be able to accept power inputs of 30 KW.

The windwheel may be a fixed pitch wheel driving hydraulic gear pump means of which the torque is arranged to be at least approximately proportional to the square of the wind wheel revolutions. In this way, the fixed pitch wheel can operate at substantially maximum efficiency over the whole of a wide speed range. By virtue of the accumulation of energy in intermediate form, so that the wind wheel does not drive the generator directly, there is no limitation on wheel speed from the point of view of optimum or maximum generator revolutions or to keep the generator output in synchronism with the mains supply.

A single gear pump has a torque proportional to speed, and would not, on its own, effect the desired relationship. However, a plurality of pumps may be quipped with by-pass means rendered progressively inoperative as wheel speed increases. For example, there may be four such similar pumps driven by the wheel at substantially equal speeds, of which three are by-passed (so as to run substantially free of torque) at a first wind speed at the lower end of a given range, and none is by-passed at a second wheel speed approximately twice the first speed at the upper end of said speed range. At the second speed, therefore, the power absorbed by the pumps will be eight times that at the said first speed, because each of the pumps is absorbing twice as much power as the single pump not by passed at the first speed. Appropriate selection of the intermediate speeds at which the by-passes on two of the four pumps cut in and out will thus substantially match the wind wheel output power to the power the pumps can absorb, and give a highly efficient arrangement in which wheel speed approximates very closely to the optimum speed for all conditions across the chosen speed range.

Of course it may be desirable to have a speed range in which the maximum speed is greater than twice the minimum speed, and this will be accommodated by having some planned loss of efficiency at the very lowest speeds, and by the provision of an excess energy dumping arrangement at the high end of the range. The energy may be dumped in intermediate form as by flow of hydraulic fluid through a restricted orifice, which can be controlled by a bleed-off valve actuated by a limit switch on the piston-in-cylinder arrangement.

BRIEF DESCRIPTION OF THE DRAWINGS

Embodiments of a method and apparatus for electric power generation from wind and wave energy will now be described with reference to the accompanying drawings in which:

FIG. 2 is a diagrammatic illustration of apparatus for producing electric power from wave motion, and FIG. 3 shows how two or more energy sources can be harnessed to a common generator means.

DESCRIPTION OF THE PREFERRED EMBODIMENTS

Figure 1:
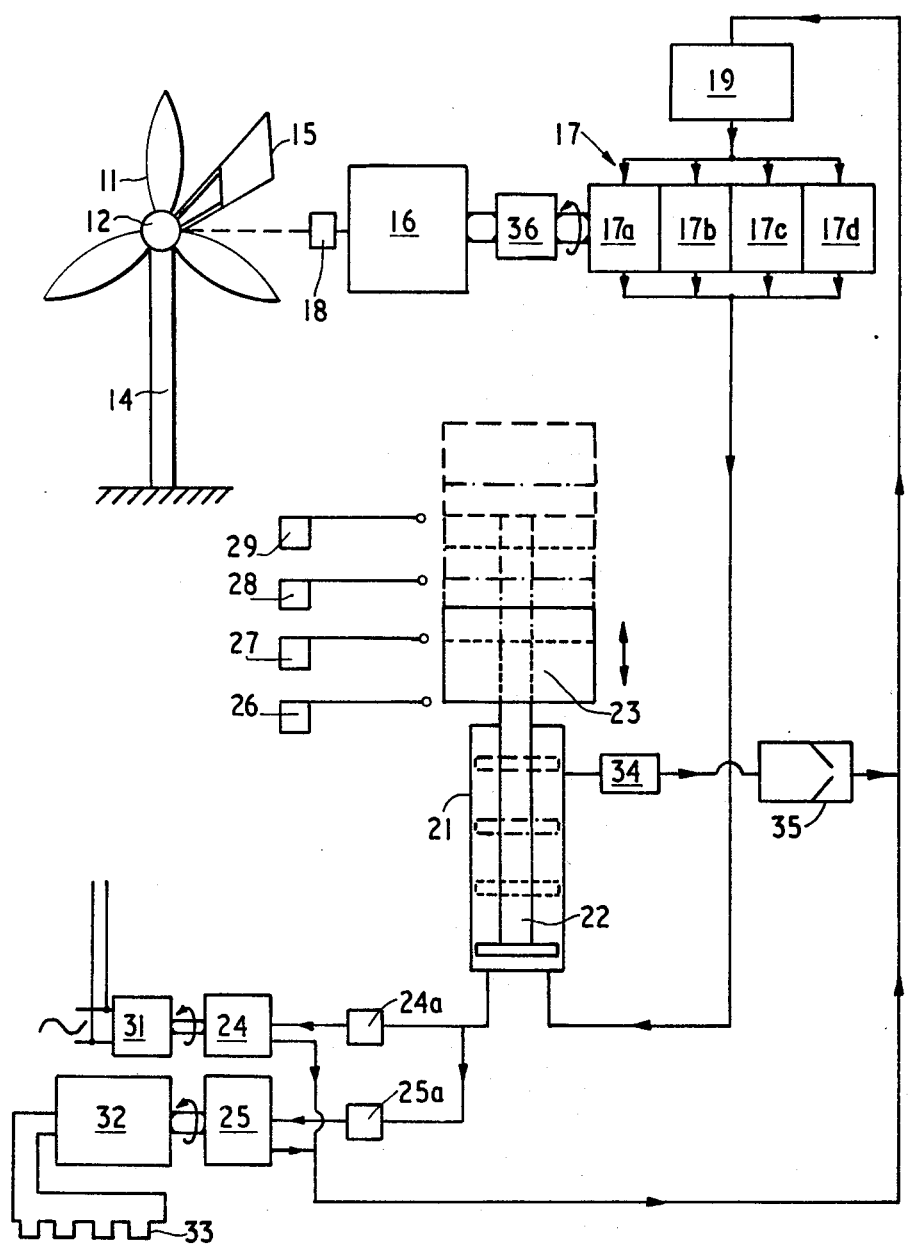
FIG. 1 is a diagrammatic illustration of apparatus for providing up to 30 KW of electric power from a 60 foot (18 meter) wind wheel.

The apparatus illustrated in FIG. 1 comprises a three blade fixed pitch wind wheel 11 on a support structure in which the blade shaft 12 is mounted on a vertical post 14 so that it can be faced into the wind by a tail fin 15. The wheel 11 drives through step up gearing 16 a hydraulic pump arrangement 17 comprising four hydraulic gear pumps 17a, 17b, 17c and 17d. A shaft speed transducer 18 controls by-passes on three of the pumps so that at low shaft speeds only one pump, say pump 17a, is on torque but at high shaft speeds all four pumps are on torque and at intermediate speeds pumps 17b and 17c are brought on torque so that the torque of the gear pump arrangement as a whole increases approximately according to the square of the shaft speed. It may well be arranged for example that at a wind speed of 10 mph (16 kph) the pump 17a only is on torque, but at 20 mph (32 kph) all four pumps are on torque. Shaft speed will then be double, at 20 mph, what it was at 10 mph, and the total power absorbed by the gear pumps at 20 mph will be eight times what it is at 10 mph wind speed. The power output of a fixed pitch wind wheel whose tip speed is proportional to wind speed—the condition for maximum efficiency over the operating range—is proportional to the cube of the wind speed. So the gear pump arrangement 17 already matches the fixed pitch wind wheel and allows substantially maximum efficiency operation across the whole speed range.

Instead of gear pumps, variable displacement swash plate pumps may be used.

The pump arrangement 17 draws hydraulic fluid from a header tank 19 and delivers it under constant pressure to the bottom of a cylinder 21 in which works a piston 22 gravity loaded by a ballast weight 23 which in fact determines the said constant pressure. The fluid passes out of the cylinder to drive the hydraulic motors 24, 25 according as associated control valves 24a, 25a are open or closed.

If the pump arrangement delivers more fluid to the cylinder 21 than passes out to drive the motors 24, 25, then the piston 22 will rise in the cylinder 21. The movements of the piston 22 in the cylinder 21 control the valves 24a, 25a through limit switches 26, 27, 28, 29. When the piston rises to trip limit switch 27, valve 24a is opened to allow hydraulic pressure to the motor 24, which is a 5 KW hydraulic motor driving a 5 KW induction generator 31 which is mains energised. If the rate at which the fluid leaves the cylinder 21 is greater than the rate at which the pump arrangement 17 supplies fluid to the cylinder, the piston 22 will fall again and will actuate limit switch 26 to close the valve 24a, allowing the piston again to rise. In the meantime, however, the motor 24 will have been driven at such constant pressure as is necessary to drive the induction generator 31 at its rated speed. While the motor 24 is shut down, the pump arrangement 17 will, so long as the wind turns the wind wheel 11, accumulate hydraulic fluid in the cylinder 21, elevating the piston until it again trips limit switch 27 to open valve 24a to actuate motor 24 once again. Thus at low wind speeds, the wind energy will be accumulated as hydraulic fluid under constant pressure in the cylinder 21, the system actuating motor 24 intermittently, but at constant pressure and therefore maximum efficiency.

The higher the wind speed, the longer will be the periods for which the motor drives the generator 31. At a certain wind speed, the output of the pump arrangement 17 will exceed the consumption of the motor 24, and the piston will rise further because of the continued accumulation of fluid in the cylinder 21. The generator will then be operating continuously. If the piston continues to rise, it will actuate switch 28, which does not affect valve 24a so that the motor 24 and generator 31 continue to operate, but which opens valve 25a so that the hydraulic motor 25 operates. This motor 25 drives a self energised induction generator 32 connected to a resistive load 33 for heating purposes. This generator 32 can be a 25 KW generator which is driven at its rated speed and therefore, again, maximum efficiency.

At intermediate wind speeds, the piston 22 will rise and fall in the cylinder 21 between the position at which switch 28 opens valve 25a and the position at which switch 27 closes the same, so that the motor 25 is operated intermittently, as was the motor 24 at lower wind speeds. When the wind speed is high enough, however, the motor 25 will also rotate the generator 32 continuously.

At higher wind speeds still, the pump arrangement 17 will supply even more fluid to the cylinder 21 than will be taken by the motors 24, 25 operating continuously. Matters are preferably so arranged that this happens only infrequently, but it is still possible to operate the system by having a further limit switch 29 to open a bleed off valve 34 allowing the excess fluid to be dumped back to a header tank 18 through an energy dissipating orifice 35.

At these higher wind speeds it is also possible to control the supply of energy to the accumulator by automatically deployed flaps or spoilers on the blades of the wind wheel 11. This of course entails some loss of efficiency, but again it can be arranged to be necessary only at infrequently high wind speeds.

At very high wind speeds, or in the event of a malfunction, or for maintenance purposes, it will be necessary to stop the operation of the apparatus altogether, and brakes 36 are provided in the pump drive which can be operated manually or automatically from the speed transducer 18 in the event of overspeeding or by another safety circuit in the event of other malfunction.

The 5 KW mains energised induction generator 31 can be connected directly to the mains whereby to feed power thereto (through the consumption meter, driving it in reverse) whenever a locally connected load consumes less than the constant (but intermittent) 5 KW output, because the generator can be run at synchronous speed with the mains and at an equal output voltage, and no power factor problems arise. Of course, when the wind speed is inadequate to generate enough power to satisfy local demands, this is made up from the mains supply. When the apparatus is connected in this way to the mains supply, however, automatic means should be provided to actuate the brake and isolate the system in the event of a mains failure.

A single 30 KW generator could be connected to the mains supply in the same way. However, it is to be supposed that a 60 foot (18 meter) diameter wind wheel such as would be required to generate this order of power would find its principal application in country districts, where the local mains network might not be so large as comfortably to absorb such an amount of power.

Any desired type of generator can be used. For some applications a synchronous generator might be preferred, for others a d.c. generator might be more appropriate. Alternating current generators can of course be single phase or three phase.

The accumulator means may comprise more than one piston-in-cylinder arrangement—for example, for the construction of wind generators of different sizes, but using standard size parts, two or more cylinders can be connected together in parallel or in series according to whether a small number of larger generators or a larger number of smaller generators of increasing capacity are to be driven.

There is, of course, no need to operate connected to the mains. The wind generator can be used to store power in batteries or otherwise, or to generate heat and store it in insulated underground tanks for use in conjunction with heat pump or other central heating arrangement, or possibly to effect a chemical reaction such as the electrolysis of water to produce combustible hydrogen gas. Wind wheels of different sizes can be constructed with suitable accumulator and generator means and connected in different ways to different types of load. The ability to operate the generator means at optimum efficiency regardless of wind conditions by means of the inventive method brings a new level of efficiency to wind power generation, which extends the usefulness of wind wheels as sources of energy.

FIG. 2 shows how the energy accumulator might be adapted for harnessing wave power. A platform 41 secured to the sea bed supports a ratchet 42 to which a buoyant weight 43 is connected by a chain 44. A counterweight 45 keeps the chain 44 taut. The buoyant weight 43 rises and falls with the passage of the waves—assisted, if desired, by vanes or foils 46—notches the ratchet 42. The latter is connected by a chain or belt 47 to a hydraulic pump arrangement 48—equivalent to the arrangement 17 of FIG. 1—which supplies hydraulic fluid to a cylinder 49 to elevate a piston 51 loaded by a weight 52. Fluid under the pressure of the weight 52 passes according, as before, to the height of the piston to a hydraulic motor 53 which drives a generator 54.

Numerous different, more efficient ways than the simple bobbing weight device just described for extracting energy from water waves. Any such method may be used in conjunction with the energy accumulator of the present invention.

Because the energy is stored in intermediate form, and because it is immaterial what kind of energy is harnessed, the invention permits the connection of several similar or different energy conversion devices to a single electric generator system. Thus two windmills of similar or different sizes, or a group of wave energy converters, or even a wind wheel and a wave energy device can be connected to a common hydraulic accumulator.

FIG. 3 illustrates the connection together of two wind wheels to drive a common generator in a system which is suitable for harnessing very large wind wheel systems primarily for contribution to a mains supply.

The two wind wheels 61, 62 drive hydraulic pump arrangements (not shown) as described with reference to FIG. 1 feeding hydraulic fluid, however, to separate hydraulic accumulators 63, 64. Under the loading of the (equal) weights 63a, 64a, hydraulic fluid flows out of the accumulator when the pistons 63b, 64b attain a predetermined elevation, all as previously described. Accumulator 63 is connected to four hydraulic motors 63(1), 63(2), 63(3) and 63(4), and accumulator 64 is likewise connected to four similar hydraulic motors 64(1) to (4). These motors are of the swash plate type in which the plate angle can be set to zero, so that they can each run substantially free of friction and with zero torque.

Four limit switches 65(1) to (4) are set to be actuated by the piston 63b, and this arrangement is mirrored by switches 66(1) to (4) and piston 64b. Actuation of each limit switch causes a hydraulic or electromagnetic actuator (not shown) associated with each motor to put a positive angle on the swash plate thereof. This is, of course, simply another way of energising multiple hydraulic motors at different levels of accumulated energy, similar in concept to what was described with reference to FIG. 1.

However, instead of being connected to drive separate generators, all the motors are connected by gearing 67 to drive a single generator 68 at different power levels according to how many motors are on torque.

It will be seen that with eight motors there are eight discrete power levels separated by equal increments of power. This arrangement is very suitable for basic mains generation or at least for making a substantial contribution to a mains network demand. It can harness together very economically two or more large wind wheels or water wave devices, or even mixed wind and wave devices. Although, since with this arrangement, large amounts of power are contemplated, mains interface equipment incorporating power factor correction will be required, only one set of the same is needed for two or more large wind wheels or wave devices.

FIGS. 2 and 3 omit details such as return ducting for the hydraulic fluid, header tanks and so on, for the sake of clarity.

I claim:

1. A method for generating electricity comprising:
   (a) converting energy from a non-uniformly operating energy source into hydraulic energy,
   (b) accumulating said hydraulic energy in a piston-in-cylinder arrangement acting against a constant load,
   (c) measuring the amount of hydraulic medium in the cylinder by electrically determining the position of the piston,
   (d) converting said hydraulic energy into kinetic energy in a hydraulic motor only when the amount of hydraulic medium in the cylinder, as measured by said electrically determining step, exceeds a predetermined value, and
   (e) driving an electric generator by said hydraulic motor.

2. A method for generating electricity comprising
   (a) converting energy from a non-uniformly operating energy source into an intermediate energy form,
   (b) accumulating said intermediate energy form,
   (c) converting said intermediate energy form into kinetic energy only when the amount of accumulated energy exceeds a first predetermined value,
   (d) driving a first electric generator using said kinetic energy,
   (e) driving a second electric generator in addition to said first electric generator only when the amount of accumulated energy exceeds a second predetermined value greater than said first predetermined value.

3. A method according to claim 2, in which said second generator is connected to a purely resistive load.

4. A method for generating electricity from wind comprising:
   (a) driving from a wind wheel hydraulic pump means of which the torque is arranged to be at least approximately proportional to the square of the rate of revolution of the wheel and in which said hydraulic pump means comprises four similar pumps of which three are by-passed, so as to exert no torque, at a first pump speed at the lower end of a given speed range, and none is by-passed at a second pump speed approximately twice the said first pump speed, and intermediate numbers are by-passed at intermediate speeds,
   (b) feeding the output of said hydraulic pump means to a piston-in-cylinder arrangement against a constant load,
   (c) driving a hydraulic motor from said piston-in-cylinder arrangement only when the quantity of hydraulic medium in the cylinder exceeds a predetermined value, and
   (d) driving an electric generator from said hydraulic motor.

5. Electric power generating apparatus comprising:
   a driven source for taking energy from a non-uniformly operating source and converting it into intermediate form,
   an accumulator for said intermediate energy form,
   a motor driven from said intermediate energy,
   means automatically to control said motor so that it is driven only when the amount of accumulated energy exceeds a predetermined value,
   an electric generator driven by said motor,
   hydraulic pump means connected to said driven device,
   a loaded piston-in-cylinder arrangement connected to the output of said pump means,
   a hydraulic motor connectible to receive hydraulic medium from said piston-in-cylinder arrangement,
   control means to connect said motor to said piston-in-cylinder arrangement only when the amount of hydraulic medium in said cylinder exceeds a predetermined value, and
   an electric generator driven by said hydraulic motor.

6. Electric power generating apparatus comprising:
   (a) a driven device for taking energy from a non-uniformly operating source,
   (b) hydraulic pump means connected to said driven device,
   (c) an accumulator for hydraulic fluid from said pump means including a loaded piston-in-cylinder arrangement connected to the output of said pump means,
   (d) a hydraulic motor connectible to receive hydraulic medium from said piston in cylinder arrangement,
   (e) control means, including electric switch means actuated according to the displacement of the piston in said cylinder, to connect said motor to said piston-in-cylinder arrangement only when the amount of hydraulic medium in said cylinder exceeds a predetermined value, and
   (f) an electric generator driven by said hydraulic motor.

7. Electric power generating apparatus comprising
   (a) a driven device for taking energy from a non-uniformly operating source and converting it into intermediate form,
   (b) an accumulator for said intermediate energy form,
   (c) first motor means driven from said intermediate energy,
   (d) control means arranged to energise said first motor when the amount of accumulated energy exceeds a first predetermined value,
   (e) first electric generator connected to said first motor means,
   (f) second motor means driven from said intermediate energy, (g) said control means being arranged to energise said second motor when the amount of accumulated energy exceeds a second predetermined value, higher than said first value, and (h) a second electric generator connected to said second motor means.

8. Apparatus according to claim 7, in which said first electric generator is a single phase induction machine connected to a mains supply and a local load, and said second electric generator is connected to a purely resistive load.

9. Apparatus according to claim 8, in which said first electric generator has a smaller output than said second electric generator.

10. A method for operating a wind wheel for taking power from the wind over a range of wind speeds, including the steps of connecting said wind wheel to an energy converter, and operating said energy converter so that it effects a torque reaction on said wheel at least roughly proportional to the square of the rotational speed of the wind wheel wherein the wind wheel drives hydraulic pump means and said hydraulic pump means comprises four similar pumps of which three are by-passed at a first pump speed range, and none is by-passed at a second pump speed approximately twice the first pump speed, and intermediate numbers are by-passed at intermediate speeds.

11. Apparatus for use with a wind wheel operable at a fixed blade pitch for taking power from the wind, comprising an energy converter adapted for connection to said wind wheel and comprising means effecting a torque reaction on said wind wheel at least roughly proportional to the square of the rotational speed of the wind wheel, said energy converter comprising hydraulic pump means and said hydraulic pump means comprising four similar pumps, by-pass means for three of said pumps, rotational speed sensing means and control means controlling said by-pass means in accordance with rotational speed so that at a first rotational speed at the lower end of the speed range only one of said four pumps is on torque and at a second rotational speed higher than said first rotational speed all the pumps are on torque and intermediate numbers of pumps are on torque at intermediate speeds.

* * * * *

UNITED STATES PATENT AND TRADEMARK OFFICE
CERTIFICATE OF CORRECTION

PATENT NO. : 4,274,010
DATED : June 16, 1981
INVENTOR(S) : Henry Lawson-Tancred

It is certified that error appears in the above-identified patent and that said Letters Patent are hereby corrected as shown below:

In Claim 19, line 3, change "source" to --device--; line 11, after "device," insert --and--; line 14, before "a hydraulic" insert --said motor comprising--; line 16, before "control" insert --said automatic--, and after "means" insert --further comprising means--; line 17, change "wnen" to --when--; line 18, after "and" insert --wherein--; and line 19, change "an" to --said--, and after "generator" insert --is--.

In Claim 28, line 9, after "speed" insert --at the lower end of the speed--.

Signed and Sealed this

Twenty-second Day of December 1981

[SEAL]

Attest:

GERALD J. MOSSINGHOFF

Attesting Officer  Commissioner of Patents and Trademarks